United States Patent
Kashima et al.

(10) Patent No.: US 7,409,342 B2
(45) Date of Patent: Aug. 5, 2008

(54) SPEECH RECOGNITION DEVICE USING STATISTICAL LANGUAGE MODEL

(75) Inventors: Hiroaki Kashima, Yokohama (JP); Yoshinori Tahara, Kanagawa (JP); Daisuke Tomoda, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 789 days.

(21) Appl. No.: 10/815,211

(22) Filed: Mar. 31, 2004

(65) Prior Publication Data

US 2004/0267518 A1    Dec. 30, 2004

(30) Foreign Application Priority Data

Jun. 30, 2003    (JP)    ............................. 2003-188893

(51) Int. Cl.
*G10L 15/10*    (2006.01)
(52) U.S. Cl. ...................................... 704/240
(58) Field of Classification Search .................. 704/240
See application file for complete search history.

(56) References Cited

U.S. PATENT DOCUMENTS

| | | | | |
|---|---|---|---|---|
| 5,457,768 A | * | 10/1995 | Tsuboi et al. ............... | 704/231 |
| 6,928,404 B1 | * | 8/2005 | Gopalakrishnan et al. ..... | 704/10 |
| 7,197,457 B2 | * | 3/2007 | Weng et al. .................. | 704/255 |

FOREIGN PATENT DOCUMENTS

| | | |
|---|---|---|
| JP | PUPA64-055597 | 3/1989 |
| JP | PUPA 04289899 | 10/1992 |
| JP | PUPA05-281989 | 10/1993 |
| JP | 2967688 | 2/1996 |
| JP | PUPA10-171490 | 6/1998 |
| JP | PUPA10-198395 | 7/1998 |
| JP | PUPA 10333693 | 12/1998 |
| JP | PUPA11-259089 | 9/1999 |
| JP | PUPA2000-293196 | 10/2000 |
| JP | PUPA 01255888 | 9/2001 |
| JP | 3774698 | 4/2002 |
| JP | PUPA2002-229585 | 8/2002 |
| JP | PUPA2003-242147 | 8/2003 |
| WO | WO 02065454 | 8/2002 |

OTHER PUBLICATIONS

PUPA H11 (1999)-85183—"Speech Recognition System and its Apparatus as Well as Storage Medium Recording Speech Recognition Processing Program".

* cited by examiner

*Primary Examiner*—Susan McFadden
(74) *Attorney, Agent, or Firm*—Duke W. Yee; Herman Rodriguez; Theodore D. Fay, III

(57) ABSTRACT

A speech recognizing device. Natural speech recognizing means recognizes speech input in an application program by dictation. Recognition result converting means converts a recognition result from said natural speech recognizing means into a final recognition result processable by said application program on the basis of a grammar to he used for recognizing said input speech in a grammar method. The recognition result converting means further comprises candidate sentence generating means for evolving said grammar to generate candidate sentences that are candidates for said final recognition result: and matching means for selecting a candidate sentence as said final recognition result among the candidate sentences by matching said candidate sentences generated by said candidate sentence generating means against the recognition result by said natural speech recognizing means. The candidate sentence comprises a sentence having an associated highest score calculated according to the formula "(ngramWords−replacedWords−rejectedWords−insertedWords)/ngramWords."

2 Claims, 10 Drawing Sheets

[Figure 1]
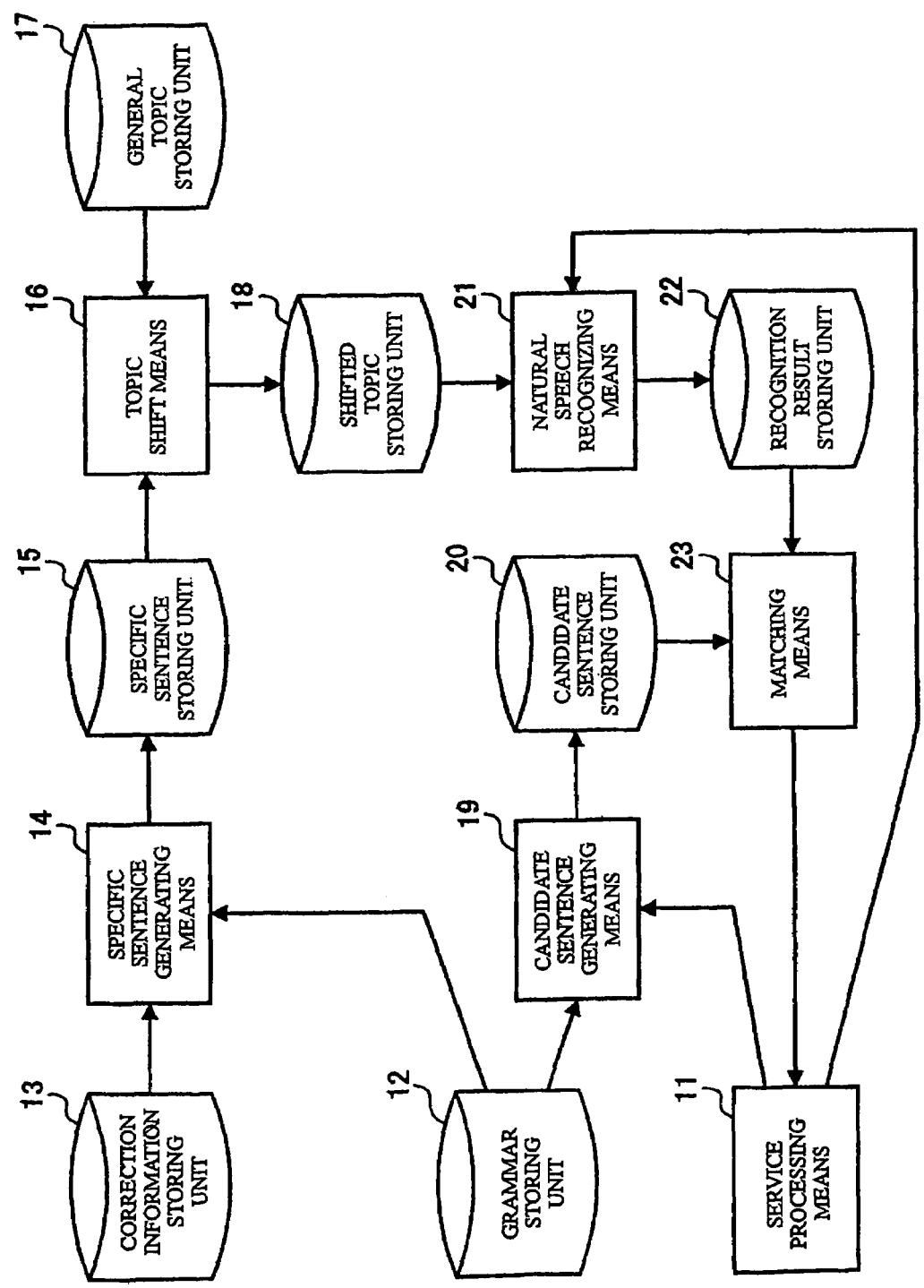

[Figure 2]
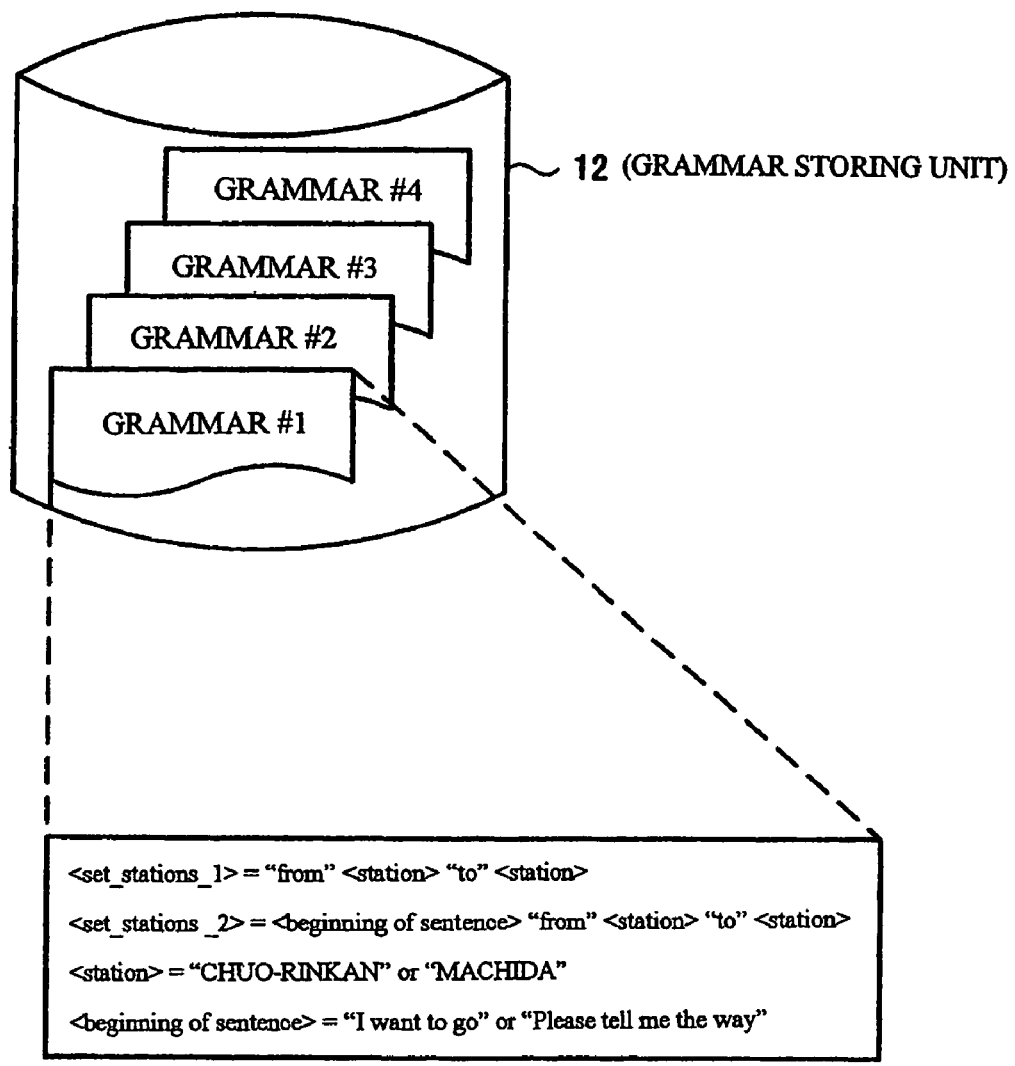

[Figure 3]
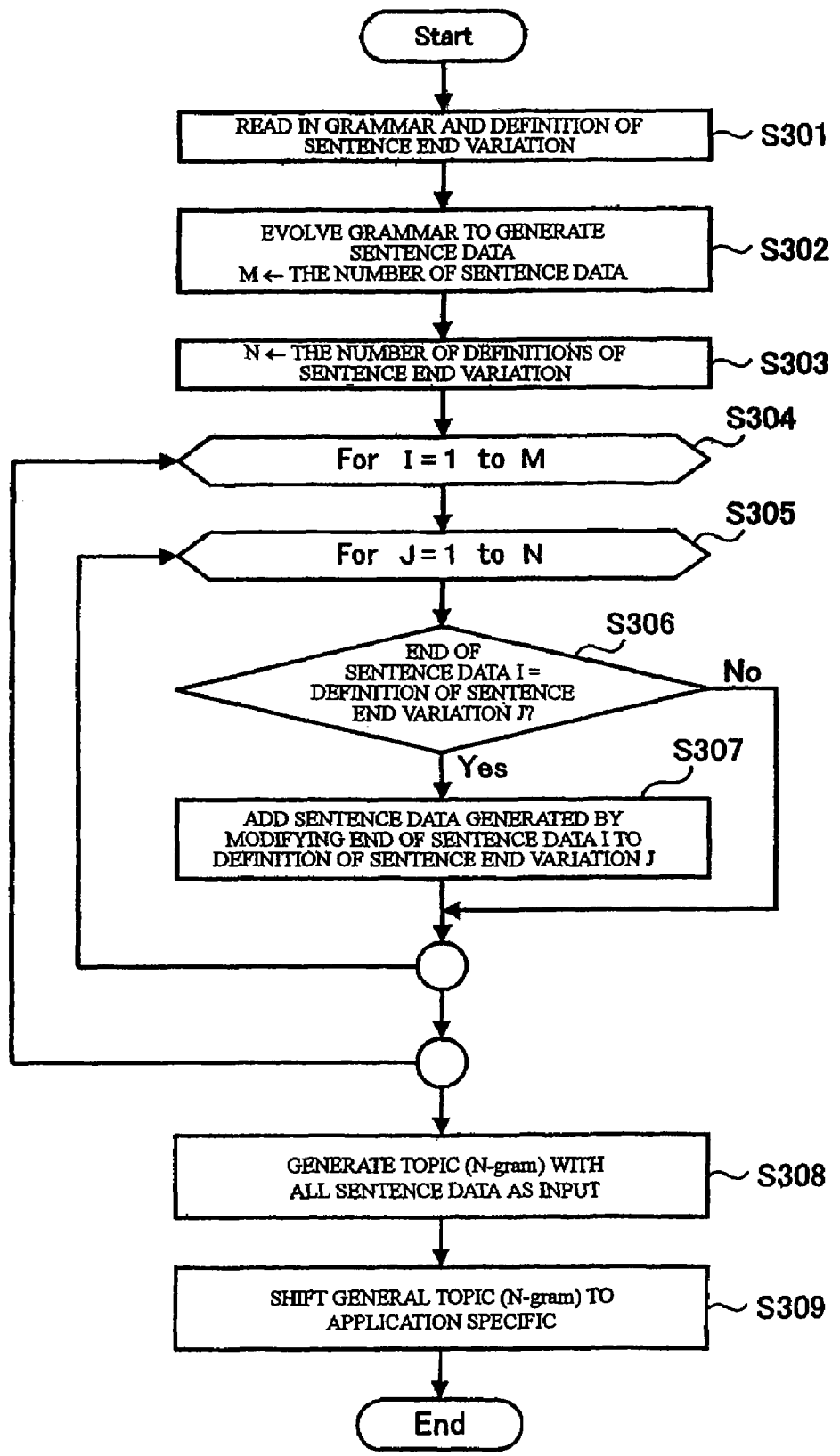

[Figure 4]
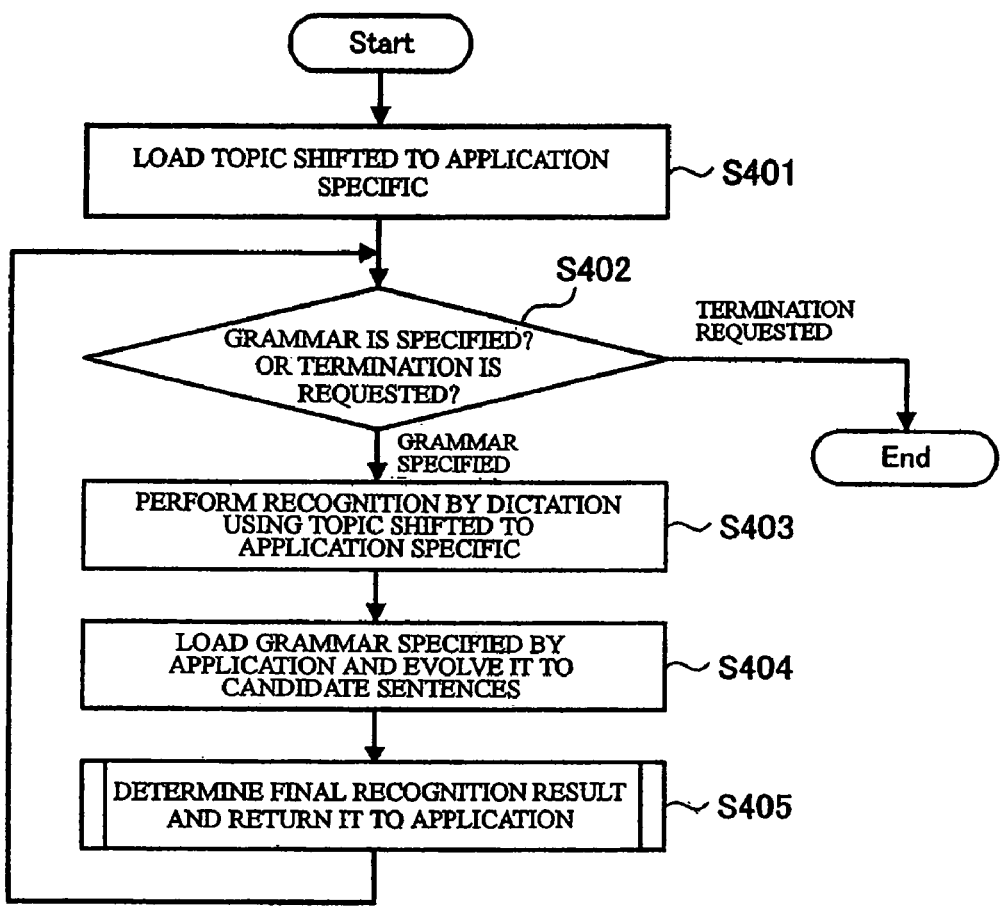

[Figure 5]
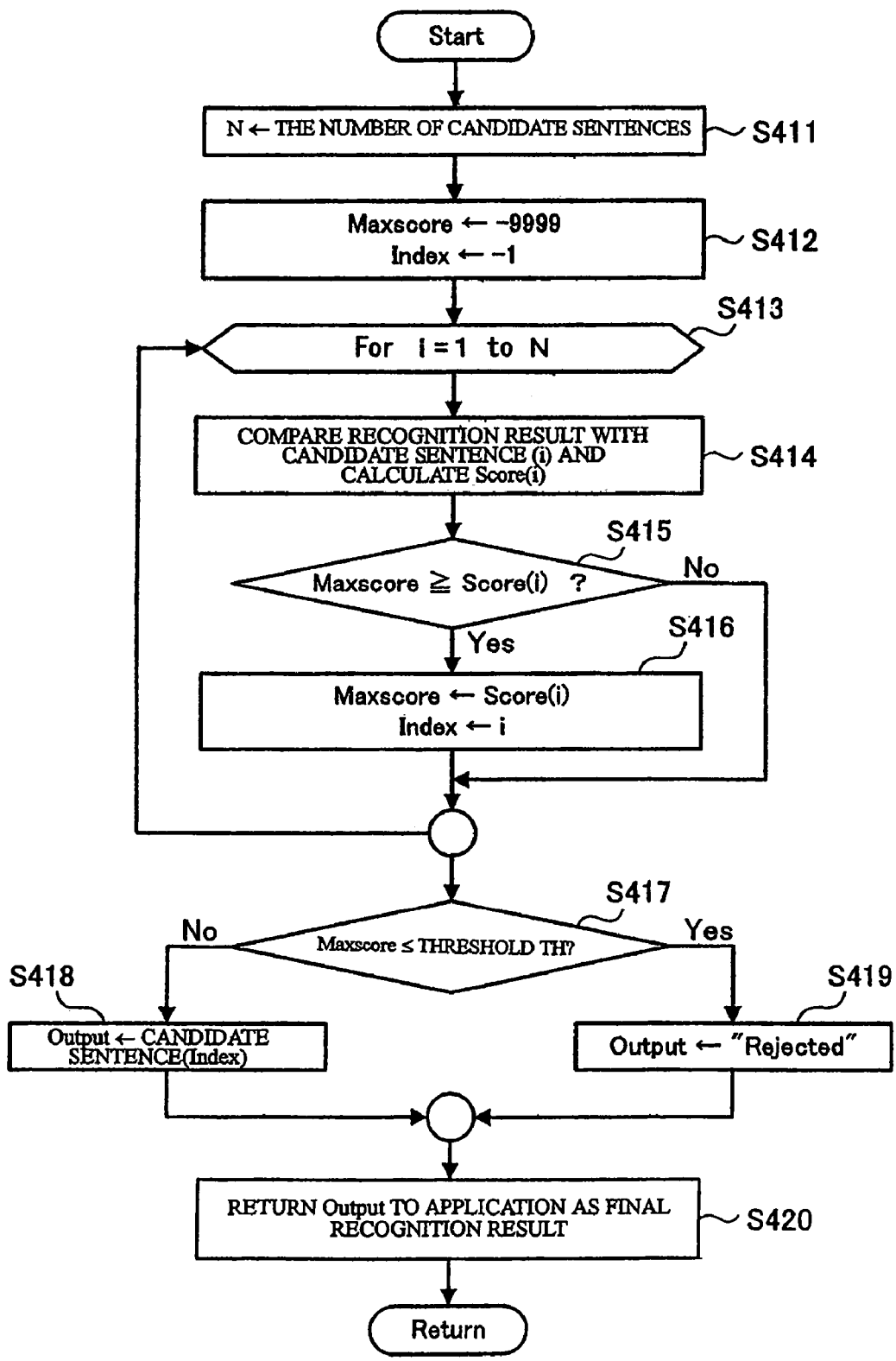

[Figure 6]

GRAMMARS PREPARED FOR APPLICATION

<set_stations_1> = "from" <station> "to" <station>

<set_stations_2> = <beginning of sentence> "from" <station> "to" <station>

<station> = "CHUO-RINKAN" or "MACHIDA"

<beginning of sentence> = "I want to go" or "Please tell me the way"

VARIATIONS OF DESINENCES PREPARED BY THE SYSTEM

I want to go ⇒ I wanna go

SENTENCE DATA SPECIFIC TO APPLICATION

From CHUO-RINKAN to MACHIDA

From MACHIDA to CHUO-RINKAN

I want to go from CHUO-RINKAN to MACHIDA

I want to go from MACHIDA to CHUO-RINKAN

I wanna go from CHUO-RINKAN to MACHIDA

I wanna go from MACHIDA to CHUO-RINKAN

Please tell me the way from CHUO-RINKAN to MACHIDA

Please tell me the way from MACHIDA to CHUO-RINKAN

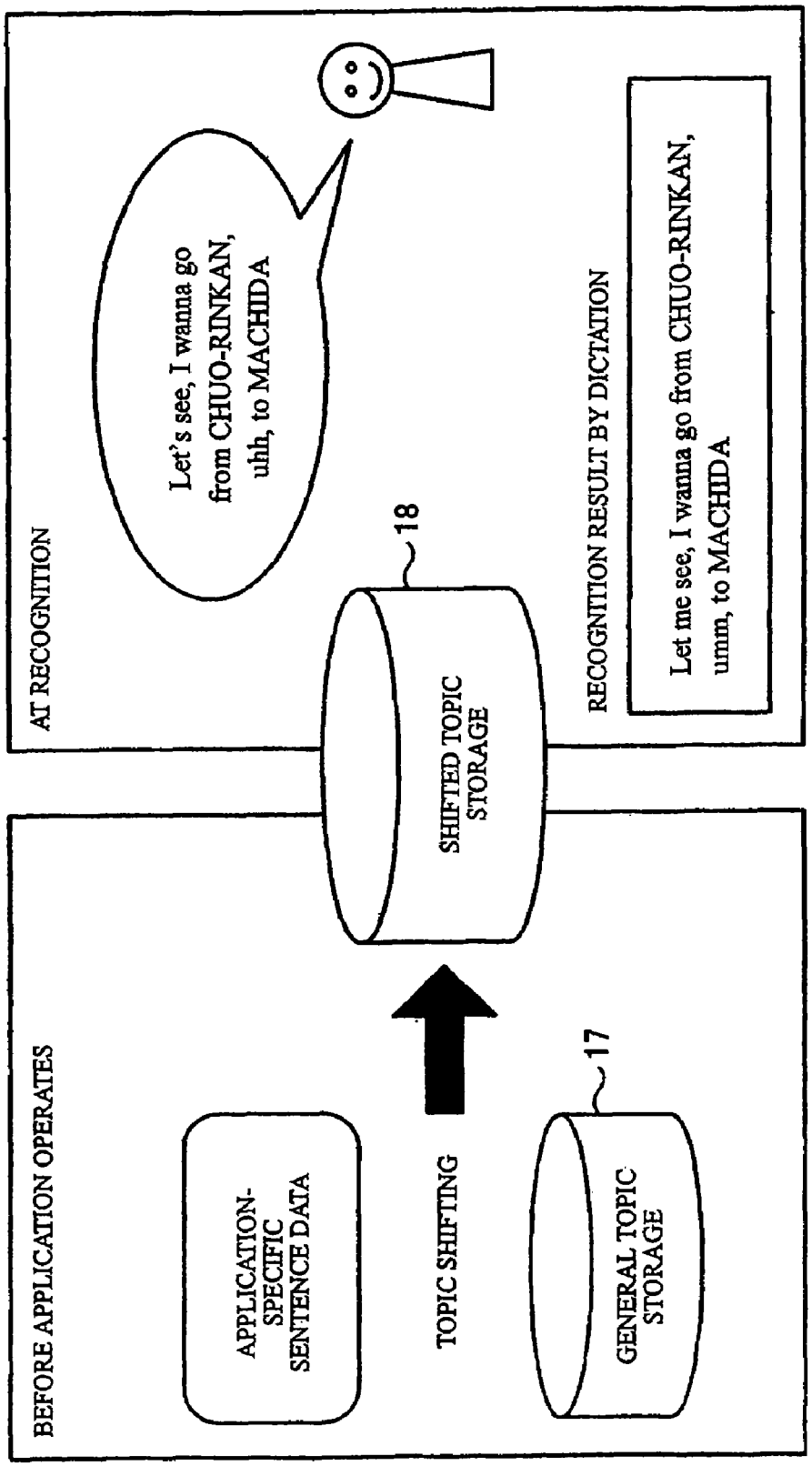
[Figure 7]

[Figure 8]

GRAMMARS PREPARED IN APPLICATION

<set_stations_1> = "from" <station> "to" <station>

<set_stations_2> = <beginning of sentence> "from" <station> "to" <station>

<station> = "CHUO-RINKAN" or "MACHIDA"

<beginning of sentence> = "I want to go" or "Please tell me the way"

CANDIDATE SENTENCES GENERATED BY
EVOLVING THE GRAMMARS
⇒ SENTENCES PROCESSABLE IN GRAMMAR METHOD

From CHUO-RINKAN to MACHIDA

From MACHIDA to CHUO-RINKAN

I want to go from CHUO-RINKAN to MACHIDA

I want to go from MACHIDA to CHUO-RINKAN

Please tell me the way from CHUO-RINKAN to MACHIDA

Please tell me the way from MACHIDA to CHUO-RINKAN

[Figure 9]
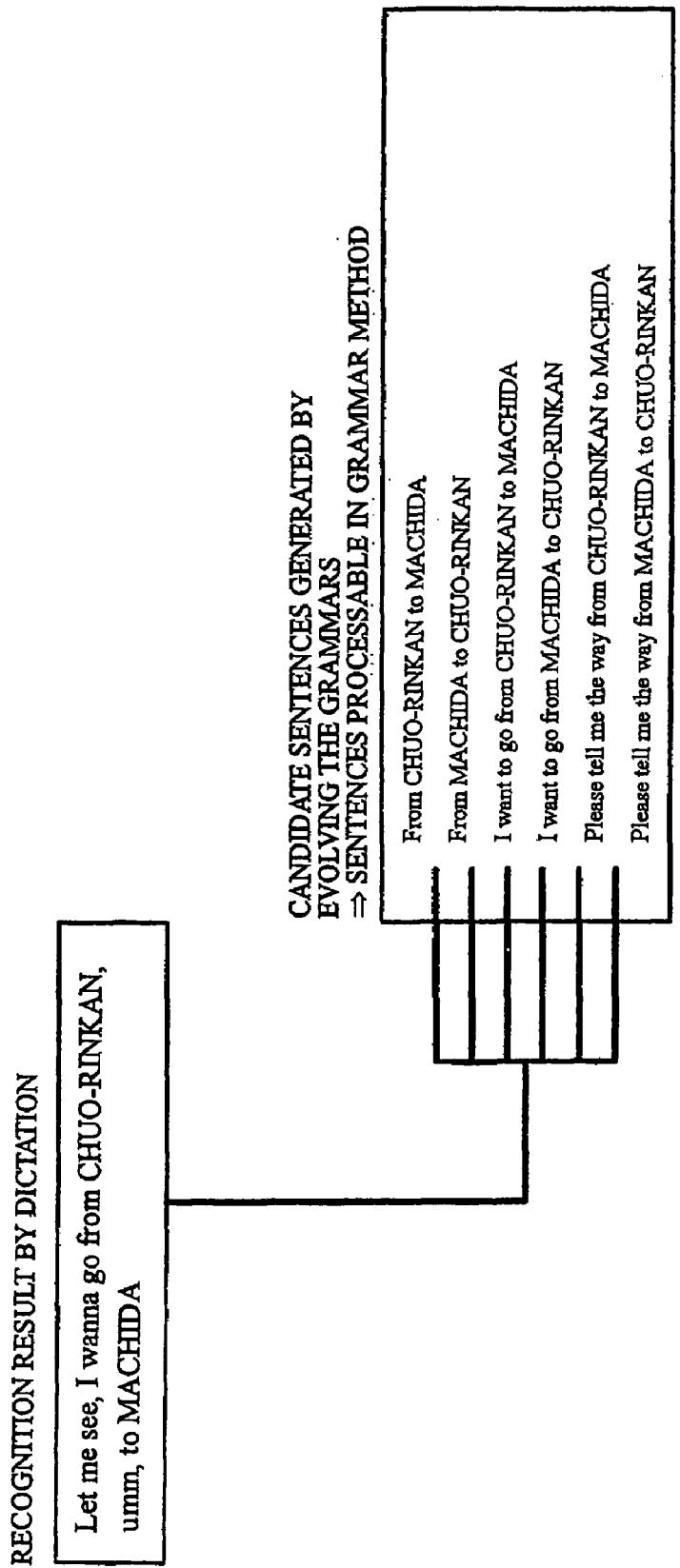

[Figure 10]
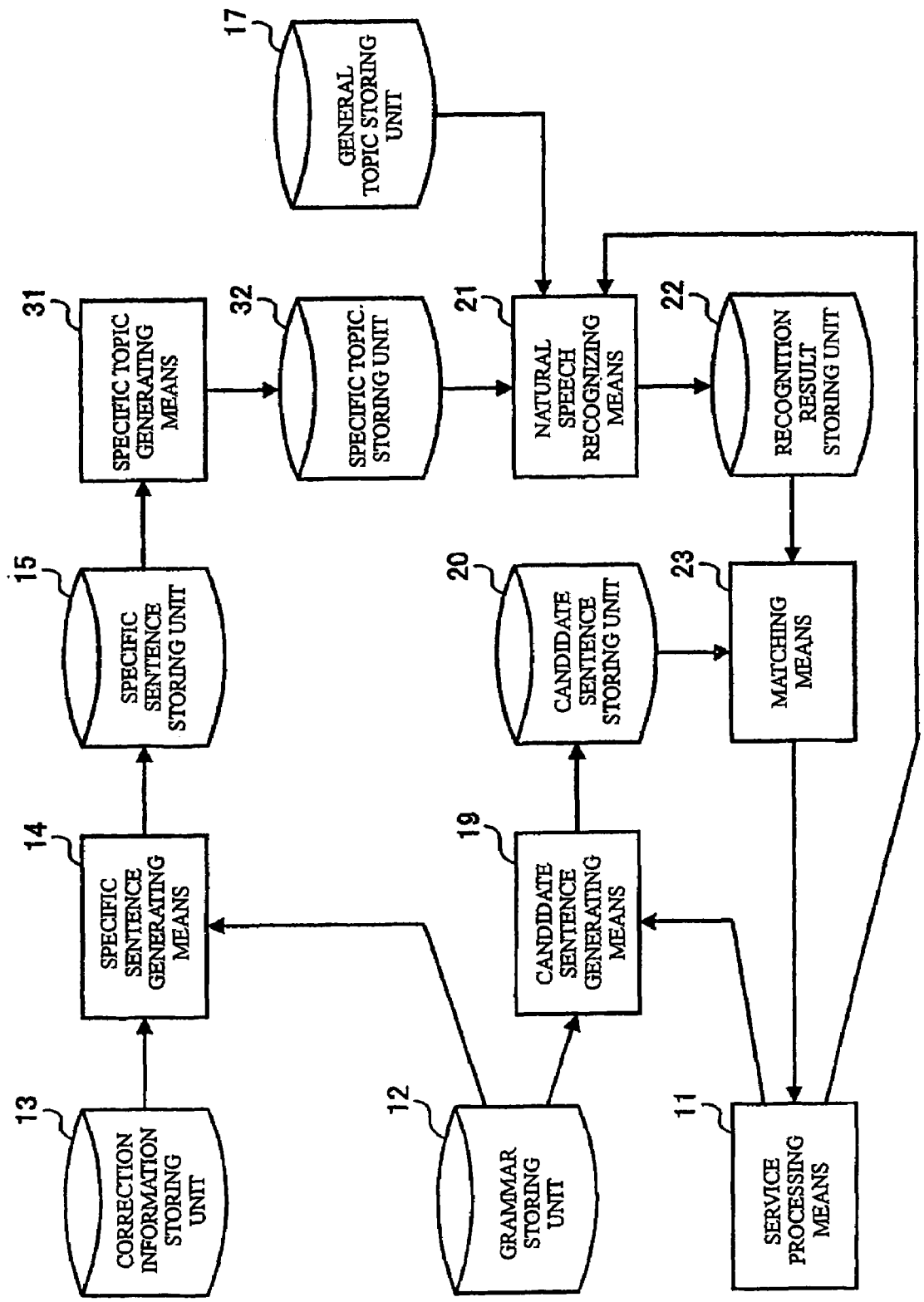

SPEECH RECOGNITION DEVICE USING STATISTICAL LANGUAGE MODEL

DETAILED DESCRIPTION OF THE INVENTION

1. Field of the Invention

The present invention relates to a speech recognizing device and the like that performs recognition of natural speech using a speech application program (hereinafter referred to as "a speech application") of grammar method.

2. Background Art

In recent years, a variety of service systems have gained widespread use that employ speech applications for performing predetermined processing based on recognition result of speech uttered by users. Such service systems include transfer guide systems for trains and flight reservation systems. Most of those systems use so called interactive speech applications, in which when a user performs voice input, a computer responds to the user audibly.

In general, such speech applications have employed a method that performs speech recognition by means of a model (state transition model) that is produced by converting a grammar to a finite-state automaton (hereinafter referred to as "grammar method"). "Grammar" refers to direct description of vocabulary and expressions (rules of word arrangement) dependent on an application. Thus, the grammar method is suitable for a speech application that involves a great number of expressions and vocabularies specific to it. The grammar method also has an advantage of easy maintenance since grammar is easy to be generated or modified.

On the other hand, for a variety of service systems using speech applications, there is a request that not only fixed utterances as described by a grammar but utterances given in our everyday conversation (hereinafter "natural speech") be recognized. The grammar method mentioned above, however, requires description of every vocabulary and expression to be received, thus, is not suitable for use in recognition of natural speech in terms of effort of the description and reduction of search efficiency proportional to the effort.

For that reason, recognition of natural speech is generally performed by dictation using a statistical language model (N-gram language model) rather than the grammar method. This model can recognize utterance deviating from a grammar without significant reduction of search efficiency because it narrows a search scope by statistics. A number of methods for recognizing natural speech with high accuracy employing a statistical language model thus have been proposed (see Patent Document 1 as an example), and also the NLU (Natural Language Understanding) method is obtaining wider use that attempts to understand the intention of utterance from recognition result.

[Patent Document 1]

Published Unexamined Patent Application No. 11-85183 (pp. 3-4, FIG. 1)

[Problems to be Solved by the Invention]

However, speech applications of grammar method have problems as follows in recognizing natural speech by dictation.

The first problem is necessity of collecting a vast amount of interaction data specific to each application and preparing a statistical language model. Such collection of interaction data is expensive and preparation of a language model also requires technical knowledge of speech recognition, which is difficult to be acquired by developers.

The second is necessity of grouping for distinguishing keywords dependent on an application from other unnecessary words for the purpose of processing results of speech recognition in the application. This grouping also requires technical knowledge about speech recognition and is expensive.

The third is necessity to describe significant number of rules for understanding intention of utterance from a sequence of keywords thus obtained. This description of rules also increases operation cost.

The invention has been made to solve those technical challenges, having an object of enabling recognition of natural speech for a speech application of grammar method without much effort and cost.

Another object of the invention is to allow application developers to perform recognition of natural speech with a speech application of grammar method without acquiring technical knowledge of speech recognition.

SUMMARY OF THE INVENTION

With those objects, the invention utilizes grammars that have been used for performing speech recognition by grammar method as input data for generating a statistical language model to be used for speech recognition by dictation. That is, the statistical language model generating device of the invention comprises readout means for reading out a grammar to be used for recognizing speech inputted to an application program by grammar method, and statistical language model generating means for generating a statistical language model to be used for recognizing speech inputted to the application program by dictation on the basis of the grammar read out by the readout means.

The statistical language model generating means may further comprise specific sentence generating means for evolving the grammar read out by the readout means and generating sentence data specific to the application program and may use the sentence data generated by the specific sentence generating means for generating a statistical language model.

The invention also converts recognition result by dictation to a form that can be processed in grammar method. That is, the speech recognizing device of the invention comprises natural speech recognizing means for recognizing speech inputted to an application program by dictation, and recognition result converting means for converting recognition result from the natural speech recognizing means into a final recognition result processable by the application program on the basis of a grammar to be used for recognizing the inputted speech in grammar method.

The recognition result converting means may comprise candidate sentence generating means for evolving a grammar to generate candidate sentences that are candidates for the final recognition result, and matching means for selecting a candidate sentence as the final recognition result among the candidate sentences by matching the candidate sentences generated by the candidate sentence generating means against the recognition result by the natural speech recognizing means.

From another point of view, the invention can be considered to be a statistical language model generating method for a statistical language model generating device. That is, the statistical language model generating method of the invention comprises the steps of reading out a grammar to be used for recognizing speech inputted to an application program in grammar method from a grammar storing unit, generating a statistical language model to be used for recognizing speech inputted to the application program by dictation on the basis of the read-out grammar, and storing the generated statistical language model into a statistical language model storing unit that can be referred to by the application program.

The step of generating a statistical language model may further comprise the steps of evolving the read-out grammar and generating sentence data specific to the application program, and generating a statistical language model based on the generated sentence data.

The invention can be also viewed as a speech recognizing method for a speech recognizing device. That is, the speech recognizing method of the invention comprises the steps of reading out a statistical language model to be used for recognizing speech inputted to an application program by dictation from statistical language model storing means, recognizing speech inputted to the application program by dictation using the read-out statistical language model, reading out a grammar to be used for recognizing the inputted speech in grammar method from a grammar storing unit, and converting a recognition result by dictation into a final recognition result processable by the application program on the basis of the read-out grammar.

The step of converting the recognition result may further comprise the steps of evolving the read-out grammar to generate candidate sentences that are candidates for the final recognition result, and selecting a candidate sentence as the final recognition result among the candidate sentences by matching the generated candidate sentences against the recognition result by dictation.

The invention can be also viewed as a program for causing a statistical language model generating device to implement predetermined operations. That is, the program of the invention causes a computer to implement the operations of reading out a grammar to be used for recognizing speech inputted to an application program in grammar method, and generating a statistical language model to be used for recognizing speech inputted to the application program by dictation on the basis of the read-out grammar.

The program may further implement, as the operation of generating a statistical language model, the operations of evolving the read-out grammar to generate sentence data specific to the application program, and generating a statistical language model on the basis of the generated sentence data.

The invention can also be viewed as a program for causing a speech recognizing device to implement predetermined operations. That is, the program of the invention causes a computer to implement the operations of recognizing speech inputted to an application program by dictation, and converting recognition result by dictation into a final recognition result processable by the application program on the basis of a grammar to be used for recognizing the inputted speech in grammar method.

The program may further implement, as the operation of converting the recognition result, the operations of evolving the read-out grammar to generate candidate sentences that are candidates for the final recognition result, and selecting a candidate sentence as the final recognition result among the candidate sentences by matching the generated candidate sentences against the recognition result by dictation.

Preferred Embodiment

In the following description, the invention will be described in detail with its embodiments shown in the accompanying drawings.

FIG. 1 is a block diagram showing the overall configuration of an embodiment of the invention. As shown, the embodiment comprises service processing means 11, a grammar storing unit 12, correction information storing unit 13, specific sentence generating means 14, specific sentence storing unit 15, topic shift means 16, general topic storing unit 17, shifted topic storing unit 18, candidate sentence generating means 19, candidate sentence storing unit 20, natural speech recognizing means 21, recognition result storing unit 22, and matching means 23.

The service processing means 11 performs predetermined service processing by executing a speech application.

The grammar storing unit 12 stores grammars that describes rules of word arrangement that are expected to be input by voice for each speech unit for the speech application executed by the service processing means 11. A "speech unit" is a unit with which a user performs voice input in accordance with a request for input by a computer. If the speech application is for a train transfer guide, input of an origin station and a destination station (such as "I'd like to go from ○○ station to xx station.") or input of time (such as "I want to get there at 10:00.") corresponds to the speech unit.

FIG. 2 shows an example of stored content of the grammar storing unit 12. FIG. 2 is drawn under the assumption that a single application uses the grammars. Because an interactive speech application typically contains a plurality of speech units, FIG. 2 shows a plurality of grammars. Assuming that the application is a train transfer guide, grammar #1 can be a grammar for the speech unit of input of an origin station and a destination station and grammar #2 can be a grammar for the speech unit of time input, for example. If multiple grammars exist for one application, each of the grammars is identified by identification information that uniquely identifies each grammar.

While FIG. 2 shows four grammars, the number of grammars is not limited to this. Also, if the service processing means 11 executes a number of speech applications, the grammar storing unit 12 may store grammars used in those applications all together. In such a case, identification information for a grammar includes information indicating which application uses the grammar.

For grammars to be stored in the grammar storing unit 12, any grammar that has been already prepared for use in an existing application can be utilized as it is.

The correction information storing unit 13 stores correction information that is used to add a predetermined variation to a grammar prepared for the application. The correction information includes information for giving a predetermined variation to ending of sentence data evolved from a grammar, for example. However, this is not limitation but the correction information may be considered as information that gives various variations to a grammar prepared as fixed expressions that are likely to occur when the grammar is naturally spoken.

The specific sentence generating means 14 generates sentence data specific to the application based on a grammar read from the grammar storing unit 12 and correction information read from the correction information storing unit 13.

The specific sentence storing unit 15 is for storing sentence data specific to the application generated by the specific sentence generating means 14.

The topic shift means 16 shifts a topic that is used by the natural speech recognizing means 21 in speech recognition by dictation from a general topic to an application-specific one.

A "topic" is originally a concept that indicates for what object speech is uttered, however, it herein refers to statistical information to be used for determining as what sequence of words speech should be interpreted. Often, the same sequence of sounds has to be interpreted as sequences of different words depending on situations. In such a case, it is topic that enables interpretation in appropriate meaning for a situation in which speech has been uttered.

As an example, speech in case you want to go from CHUO-RINKAN station to MACHIDA station, which are Japanese station names, "I want to go to MACHIDA from CHUO-RINKAN" may be interpreted as a sequence of words "I want to go from true being kind to my cheetah" by base dictation that uses a general topic. However, dictation using a topic for Japanese train transfer guide will increase the possibility that the speech is interpreted as a sequence of right words.

Also, a topic can involve statistical information that considers in what dialect speech is uttered.

The general topic storing unit 17 stores a general topic, namely, a generic N-gram language model.

The shifted topic storing unit 18 stores a topic that has been shifted to application specific by the topic shift means 16, that is, a N-gram language model that has been shifted from a generic N-gram language model to one specific to the application.

The candidate sentence generating means 19 evolves all the phrases that can be received by the application from the grammars stored by the grammar storing unit 12 to generate candidate sentences.

The candidate sentence storing unit 20 stores candidate sentences generated by the candidate sentence generating means 19.

The natural speech recognizing means 21 recognizes inputted speech using the N-gram language model stored in the shifted topic storing unit 18.

The recognition result storing unit 22 stores results of speech recognition by the natural speech recognizing means 21.

The matching means 23 matches recognition result stored in the recognition result storing unit 22 against candidate sentences stored in the candidate sentence storing unit 20.

The embodiment is implemented by a computer system. The computer system can be of a first system configuration that consists of a single computer that comprises all the functions of the embodiment or of a second system configuration that consists of a number of computers each of which comprises some of the functions of the embodiment.

Whether the first system configuration or the second configuration is adopted, however, the hardware configuration of each computer may be a general one that comprises a central processing unit (CPU), main memory, an auxiliary storage device such as a hard disk, an input device, and output device.

In the case of the first system configuration, the auxiliary storage device of the computer stores programs for implementing the service processing means 11, specific sentence generating means 14, topic shift means 16, candidate sentence generating means 19, natural speech recognizing means 21, and matching means 23, and those programs are read into the main memory and executed by the CPU so that the service processing means 11, specific sentence generating means 14, topic shift means 16, candidate sentence generating means 19, natural speech recognizing means 21, and matching means 23 are implemented. The grammar storing unit 12, correction information storing unit 13, specific sentence storing unit 15, general topic storing unit 17, shifted topic storing unit 18, candidate sentence storing unit 20, and recognition result storing unit 22 may be implemented by the auxiliary storage device of the computer or by a portable recording medium that can be attached to the computer.

The second system configuration can consist of a computer having the function of generating a statistical language model (statistical language model generating device) and a computer having the function of recognizing natural speech using the statistical language model generated by the statistical language model generating device and receiving/passing recognition result in a form that can be processed by the grammar method application (speech recognizing device).

In this case, programs for implementing the specific sentence generating means 14 and topic shift means 16 are stored in the auxiliary storage device in the statistical language model generating device, and those programs are read into the main memory and executed by the CPU of the statistical language model generating device so that the specific sentence generating means 14 and topic shift means 16 are implemented. The correction information storing unit 13, specific sentence storing unit 15, general topic storing unit 17, and shifted topic storing unit 18 may be implemented by the auxiliary storage device of the statistical language model generating device or by a portable recording medium that can be attached to the statistical language model generating device.

Meanwhile, programs for implementing the service processing means 11, candidate sentence generating means 19, natural speech recognizing means 21, and matching means 23 are stored in the auxiliary storage device of the speech recognizing device, and those programs are read into the main memory and executed by the CPU of the speech recognizing device so that the service processing means 11, candidate sentence generating means 19, natural speech recognizing means 21, and matching means 23 are implemented. The grammar storing unit 12, candidate sentence storing unit 20, and recognition result storing unit 22 may be implemented by the auxiliary storage device of the speech recognizing device or by a portable recording medium that can be attached to the speech recognizing device.

The operation of the embodiment will be now described in detail.

FIG. 3 shows a flowchart illustrating the operation of generating a statistical language model in the embodiment. This flowchart corresponds to the flow of statistical language model generation by the computer in the first system configuration and to the operation of the statistical language model generating device in the second system configuration.

The description following assumes that a statistical language model for one particular application is generated, and the correction information storing unit 13 has stored therein as correction information definitions of sentence-end variations that associate ends of sentence with variations of sentence end.

First, the specific sentence generating means 14 reads in a grammar from the grammar storing unit 12 and also reads in the definitions of sentence-end variation from the correction information storing unit 13 (step 301). The specific sentence generating means 14 then evolves the grammar to create sentence data specific to the application. Specifically, it converts a grammar that has been conventionally used for the purpose of recognition into input data for generating an application-specific topic for use in dictation. Further, it sets the number of generated sentence data in variable M (step 302). Also, it sets the number of definitions of sentence-end variation read at step 301 in variable N (step 303).

After setting variables M and N, the specific sentence generating means 14 repeats processing at steps 305 to 307 while setting variable I to 1 through M (step 304). It also repeats processing at steps 306 and 307 while setting variable J to 1 through N (step 305). That is, processing at steps 306 and 307 is performed for all combinations of variables I and J.

At step 306, it is determined if the end of Ith sentence data (hereinafter "sentence data I)" is equal to the head of the Jth definition of sentence-end variation (hereinafter "definition of sentence-end variation J"), and only if they are equal, new sentence data is added that has been generated by modifying the expression of end of the sentence data I to the definition of sentence-end variation J at step 307.

The specific sentence generating means 14 stores the sentence data thus generated in the specific sentence storage unit 15.

Subsequently, the topic shift means 16 inputs all sentence data from the specific sentence storing unit 15 and generates a topic (N-gram language model) (step 308). Then, it shifts the general topic (N-gram language model) stored in the general topic storing unit 17 to a topic (N-gram language model) specific to the application using the topic generated at step 308 (step 309).

The generation of the topic at step 308 based on sentence data can be implemented by existing techniques.

Shift from a general topic to an application-specific topic at step 309 can use a method as follows: a value that can be determined by addition of a value produced by multiplying the probability for the N-gram language model in a general topic by coefficient a to a value produced by multiplying the probability for the N-gram language model in the application-specific topic by coefficient b is used as the probability for the N-gram language model for the topic shifted to application specific. Here, the coefficients a and b are predetermined coefficients whose sum is 1.

The topic shift means 16 stores the topic thus shifted in the shifted topic storing unit 18.

While FIG. 3 shows processing of shifting a topic for one particular application, this can be applied to processing of shifting a topic for multiple applications. In that case, the processing is performed for each application in accordance with the flowchart in FIG. 3 and the topic shift means 16 stores shifted topics adding identification information for corresponding applications.

FIGS. 4 and 5 are flowcharts showing the operation of speech recognition in the embodiment. These flowcharts correspond to the flow of speech recognition by the computer in the first system configuration and to the operation of the speech recognizing device in the second system configuration.

Processing shown in FIGS. 4 and 5 is executed by the service processing means 11 calling the natural speech recognizing means 21, candidate sentence generating means 19, and matching means 23 in this order when a user made utterance in a particular speech unit contained in the speech application being executed. Management of interactions other than this is performed by a speech application as has been done in conventional cases.

The natural speech recognizing means 21 first loads the topic shifted to application specific from the shifted topic storing unit 18 (step 401). Then, it determines whether a grammar is specified or termination is requested (step 402). If termination is requested, the processing is terminated, however, if a grammar is specified, the user's utterance is recognized by dictation using the topic loaded at step 401 (the N-gram language model tailored to the application) (step 403). This dictation can recognize a wide range of natural speech covered by the general topic and also recognize a vocabulary specific to the application because it uses the topic shifted to application specific. The result of the recognition is stored in the recognition result storing unit 22.

Meanwhile, the candidate sentence generating means 19 loads a grammar corresponding to the current speech unit from the grammar storing unit 12, evolves it to candidate sentences, and stores them in the candidate sentence storing unit 20 (step 404). For example, while the application plays a prompt requesting the user to speak, identification information for a grammar that is specified in the application at the point of playing the prompt is passed to the candidate sentence generating means 19, which then evolves a grammar corresponding to the identification information. Each candidate sentence obtained from this process is in a form that can be processed by the grammar-method application, being a candidate of the final recognition result to be returned to the application.

Then, the matching means 23 matches the recognition result stored in the recognition result storing unit 22 against the candidate sentences stored in the candidate sentence storing unit 20 and selects a candidate sentence that is closest to the recognition result by dictation. And it returns the selected candidate sentence to the application as the final recognition result (step 405).

Subsequently, the application compares the recognition result with the specified grammar, and based on the result, transitions to the next interaction state.

While in FIG. 4 speech recognition by the natural speech recognizing means 21 (step 403) precedes the candidate sentence generating means 19 (step 404), this order may be the reverse or the operations may be performed in parallel.

An example of matching at step 405 will be described in detail in the following. FIG. 5 shows the flow.

First, the matching means 23 sets the number of candidate sentences in variable N (step 411). Then, it sets variable Maxscore to "−9999" and also sets variable Index to "−1" (step 412). It then repeats processing at steps 414 to 416 while setting variable i to 1 through N (step 413).

At step 414, the matching means 23 calculates Score(i) by comparing the recognition result with the ith candidate sentence (hereinafter "candidate sentence (i)"). Score(i) is an index for determining the degree of agreement between the recognition result and candidate sentence (i) and is defined such that the larger Score(i) is, there is higher degree of agreement between them. At step 415, it is determined which of the value of variable Maxstore and that of variable Score(i) is larger, and only if variable Score(i) is larger, Score(i) is assigned to variable Maxscore and also i is assigned to variable Index at step 416.

Then, the matching means 23 compares variable Maxscore with threshold TH (step 417). If Maxscore is larger than threshold TH, the candidate sentence (Index) is assigned to Output (step 418), whereas if Maxscore is smaller than threshold TH, "Rejected" is assigned to Output (step 419). The matching means 23 then returns Output to the application (step 420).

The operation of the embodiment will be described specifically using a specific example.

Assume that the grammars shown in FIG. 2 are stored in the grammar storing unit 12. Although a grammar for use in an actual transfer guide application defines more stations than this example, only two stations are defined here for the sake of simplicity.

The specific sentence generating means 14 first generates sentence data specific to the application as shown in FIG. 6.

First, evolution to sentence data at step 302 in FIG. 3 will be described.

The specific sentence generating means 14 evolves sentences by embedding "CHUO-RINKAN" and "MACHIDA" that are defined as <station> in <station> in the first definition of the specified grammar "from <station> to <station>", thereby generating sentence data "from CHUO-RINKAN to MACHIDA" and "from MACHIDA to CHUO-RINKAN". Also, it evolves sentences by embedding "CHUO-RINKAN" and "MACHIDA" that are defined as <station> in <station> in the second definition "<beginning of sentence> from <station> to <station>" and "I want to go" and "Please tell me the way" that are defined as <beginning of sentence> in <beginning of sentence>, thereby generating sentence data "I want to go from CHUO-RINKAN to MACHIDA", "I want to go from MACHIDA to CHUO-RINKAN", "Please tell me the way from CHUO-RINKAN to MACHIDA", and "Please tell me the way from MACHIDA to CHUO-RINKAN".

In the following, reflection of definitions of sentence-end variation at steps 304 to 307 in FIG. 3 will be described.

The specific sentence generating means 14 reads in the pieces of sentence data generated in the evolution above "from CHUO-RINKAN to MACHIDA", "from MACHIDA to CHUO-RINKAN", "I want to go from CHUO-RINKAN to MACHIDA", "I want to go from MACHIDA to CHUO-RINKAN", "Please tell me the way from CHUO-RINKAN to MACHIDA" and "Please tell me the way from MACHIDA to CHUO-RINKAN" one by one and determines if there is any sentence that has beginning of sentence equal to "I want to", which is the head of the definition of sentence-initial variation. At the point "I want to go from CHUO-RINKAN to MACHIDA" and "I want to go from MACHIDA to CHUO-RINKAN" have been read in, it is determined that they have end of sentence "I want to" that is the head of the definition of sentence-initial variation. Thus, the candidate sentence generating means 19 modifies the beginning of sentence "I want to" to "I wanna" to newly generate "I wanna go from CHUO-RINKAN to MACHIDA" and "I wanna to go from MACHIDA to CHUO-RINKAN" and add them to sentence data to be used for topic shifting.

Based on the sentence data specific to the application and the general topic stored in the general topic storing unit 17, the topic shift means 16 generates a topic that is shifted to application specific and stores it in the shifted topic storing unit 18. This operation is shown in the box "Before the application operates" in FIG. 7.

A case where recognition of natural speech is performed by dictation will be now described specifically according to the flow shown in FIGS. 4 and 5.

This example assumes that a user utters natural speech "Let's see, I wanna go from CHUO-RINKAN, uhh, to MACHIDA" as shown in the box "At recognition" in FIG. 7, and the natural speech recognizing means 21 recognizes this speech as "Let's me see, I wanna go from CHUO-RINKAN, umm, to MACHIDA" using the N-gram language model stored in the shifted topic storing unit 18.

In this case, the candidate sentence generating means 19 generates candidate sentences that can be processed by the application as shown in FIG. 8.

That is, the candidate sentence generating means 19 evolves sentences by embedding "CHUO-RINKAN" and "MACHIDA" that are defined as <station> in <station> in the first definition of the specified grammar "from <station> to <station>", generating candidate sentences "from CHUO-RINKAN to MACHIDA" and "from MACHIDA to CHUO-RINKAN". It further evolves sentences by embedding "CHUO-RINKAN" and "MACHIDA" that are defined as <station> in <station> in the second definition "<beginning of sentence> from <station> to <station>" and "I want to go" and "Please tell me the way" that are defined as <beginning of sentence> in <beginning of sentence> in the definition, thereby generating candidate sentences "I want to go from CHUO-RINKAN to MACHIDA", "I want to go from MACHIDA to CHUO-RINKAN", "Please tell me the way from CHUO-RINKAN to MACHIDA", and "Please tell me the way from MACHIDA to CHUO-RINKAN".

The matching means 23 matches these candidate sentences against the recognition result (N-gram recognition result) of Figure-7 as shown in FIG. 9, and selects a candidate sentence with the highest score as the final recognition result. In this processing, if any candidate sentence is the same as the N-gram recognition result, the candidate sentence is the right sentence and is given the highest score, whereas if none of the candidate sentences is the same as the N-gram recognition result, a candidate sentence that is closest to the recognition result is determined.

Calculation of the score can use an equation as follows:

$$\text{Score}=(n\text{gramWords}-\text{replacedwords}-\text{rejectedwords}-\text{insertedWords})/n\text{gramWords}$$

where, ngramWords represents the number of words contained in N-gram recognition result; replacedWords the number of words that have been replaced with different words for N-gram recognition result; rejectedWords the number of words that are contained in N-gram recognition result but not in candidate sentences; and insertedWords the number of words that are not contained in N-gram recognition result but in candidate sentences.

That is, a candidate sentence that perfectly matches the N-gram recognition result is given score 1, which will be the largest score.

Scores obtained from the matching in FIG. 9, that is, the score of each candidate sentence in FIG. 8 for the N-gram recognition result in FIG. 7 is calculated as follows:

from CHUO-RINKAN to MACHIDA: (11-0-7-0)/11=0.36 from MACHIDA to CHUO-RINKAN: (11-2-7-0)/11=0.18

I want to go from CHUO-RINKAN to MACHIDA: (11-1-4-1)/11=0.45

I want to go from MACHIDA to CHUO-RINKAN: (11-3-4-1)/11=0.27

Please tell me the way from CHUO-RINKAN to MACHIDA: (11-5-2-0)/11=0.36

Please tell me the way from MACHIDA to CHUO-RINKAN: (11-7-2-0)/11=0.18

Because the matching means 23 determines a sentence with the highest score as the final recognition result, the application receives "I want to go from CHUO-RINKAN to MACHIDA" as the final recognition result.

Variations of the embodiment can include a configuration as shown in FIG. 10.

In the configuration of FIG. 1, sentence data specific to the application stored in the specific sentence storing unit 15 is used to shift the general topic stored in the general topic storing unit 17 to an application-specific one. Whereas in the configuration in FIG. 10, the specific topic generating means 31 generates a topic specific to the application and stores it in the specific topic storing unit 32 based on application-specific sentence data stored in the specific sentence storing unit 15.

In addition, in the configuration of FIG. 1, the natural speech recognizing means 21 performs speech recognition by dictation using a topic stored in the shifted topic storing unit 18. In contrast, in the configuration in FIG. 10, the natural speech recognizing means 21 performs speech recognition by dictation using the general topic stored in the general topic storing unit 17 and an application-specific topic stored in the specific topic storing unit 32.

Other operations are the same as the configuration in FIG. 1.

In such a way, the embodiment utilizes grammars, which have been traditionally used for the purpose of conversion to a state transition model, as input data for topic generation. That is, while in conventional techniques evolution of a grammar had no meaning from the viewpoint of using it as a state transition model, the embodiment evolves grammars and uses them as sentence data for generating topics.

Further, because producing recognition result of dictation in a form processable in grammar method reduces amount of information, such conversion were not performed in conventional practices. In contrast, the embodiment dare to convert recognition result into the grammar method that can contain less information because the embodiment is intended to enable dictation without making a modification to an application of grammar method.

Additionally, a state transition model of grammar method only returns a result of "Rejected" for an input (here not a voice input but a text input indicating dictation recognition result) that does not match a statistical language model completely. Whereas, the embodiment determines a candidate sentence evolved from the grammar closest to the input by calculation, thereby reducing cases "Rejected" is returned.

With such configurations, the embodiment has an effect that speech recognition capability that accepts natural speech can be implemented in a speech application of grammar method that is designed with a state transition model in mind without modifying the application. Besides, the embodiment enables such alteration without requiring application developers to acquire technical knowledge of speech recognition and with little effort and cost.

[Advantages of the Invention]
As has been described, the invention enables recognition of natural speech for a speech application of grammar method without requiring much effort and cost.

BRIEF DESCRIPTION OF THE DRAWINGS

FIG. 1 is a block diagram showing the overall configuration of an embodiment;

FIG. 2 shows an example of stored content of the grammar storing unit in the embodiment;

FIG. 3 is a flowchart showing the operation of statistical language model generation in the embodiment;

FIG. 4 is a flowchart showing the operation of speech recognition in the embodiment;

FIG. 5 is a flowchart showing the operation of matching in the embodiment;

FIG. 6 shows an example of specific data generation in the embodiment;

FIG. 7 shows an example of topic shifting and natural speech recognition in the embodiment;

FIG. 8 shows an example of candidate sentence generation in the embodiment;

FIG. 9 shows an example of matching in the embodiment; and

FIG. 10 is a block diagram showing the overall configuration of a variation of the embodiment.

DESCRIPTION OF SYMBOLS

11 . . . Service processing means
12 . . . Grammar storing unit
13 . . . Correction information storing unit
14 . . . Specific sentence generating means
15 . . . Specific sentence storing unit
16 . . . Topic shift means
17 . . . General topic storing unit
18 . . . Shifted topic storing unit
19 . . . Candidate sentence generating means
20 . . . Candidate sentence storing unit
21 . . . Natural speech recognizing means
22 . . . Recognition result storing unit
23 . . . Matching means
31 . . . Specific topic generating means
32 . . . Specific topic storing unit

The invention claimed is:

1. A speech recognizing method comprising the steps of:
reading out a statistical language model to be used for recognizing speech to be input in an application program by dictation from statistical language model storing means;
recognizing speech input in said application program by dictation with said readout statistical language model;
reading out a grammar to be used for recognizing said input speech in a grammar method from a grammar storing unit; and
converting a recognition result by said dictation into a final recognition result processable by said application program on the basis of said readout grammar, wherein converting further comprises:
evolving said read-out grammar to generate candidate sentences that are candidates for said final recognition result; and
selecting a candidate sentence as said final recognition result among the candidate sentences by matching said generated candidate sentences against the recognition result by said dictation, and wherein the candidate sentence comprises a sentence having an associated highest score calculated according to the formula:

(ngramWords−replacedWords−rejectedWords−insertedWords)/ngramWords wherein "ngramWords" comprises a first number of words contained in an N-gram recognition result "replacedWords" comprises a second number of words that have been replaced with different words for the N-gram recognition result, "rejectedWords" comprises a third number of words that are contained in the N-gram recognition result but not in the candidate sentences, and "insertedWords" comprises a fourth number of words that are not contained in the N-gram recognition result but are contained in the candidate sentences.

2. The speech recognizing method according to claim 1, further comprising the steps of;
reading out a grammar to be used for recognizing speech inputted to an application program in grammar method from a grammar storing unit;
generating a statistical language model to be used for recognizing speech inputted to said application program by dictation on the basis of said read-out grammar;
storing said statistical language model generated in statistical language model storing means;
reading out said statistical language model from said statistical language model storing means, and
wherein said step of recognition by dictation recognizes said inputted speech by dictation using said statistical language model read out.

* * * * *